US010755270B2

(12) United States Patent
Chester et al.

(10) Patent No.: US 10,755,270 B2
(45) Date of Patent: Aug. 25, 2020

(54) INTER-DEVICE CREDENTIAL TRANSFER

(71) Applicant: Apple Inc., Cupertino, CA (US)

(72) Inventors: Benjamin D. Chester, San Jose, CA (US); Glen W. Steele, Sunnyvale, CA (US); Jeff W. Lin, San Jose, CA (US); Vineet Chadha, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 217 days.

(21) Appl. No.: 15/675,626

(22) Filed: Aug. 11, 2017

(65) Prior Publication Data

US 2018/0082288 A1 Mar. 22, 2018

Related U.S. Application Data

(60) Provisional application No. 62/396,075, filed on Sep. 16, 2016.

(51) Int. Cl.
*G06Q 20/38* (2012.01)
*G06Q 20/08* (2012.01)

(52) U.S. Cl.
CPC ....... *G06Q 20/3821* (2013.01); *G06Q 20/085* (2013.01)

(58) Field of Classification Search
USPC .......................................................... 705/18
See application file for complete search history.

(56) References Cited

U.S. PATENT DOCUMENTS 9,317,704 B2 * 4/2016 Brudnicki ............. H04L 63/102
2017/0270517 A1 * 9/2017 Vasu ................... G07C 9/00896

* cited by examiner

*Primary Examiner* — Garcia Ade
(74) *Attorney, Agent, or Firm* — Morgan, Lewis & Bockius LLP

(57) ABSTRACT

A device implementing an inter-device credential transfer system may include at least one processor that is configured to receive a request to transfer a transaction credential from a first device to a second device, the transaction credential being associated with a stored monetary value and the request comprising a transaction credential identifier of the transaction credential. The at least one processor is further configured to prevent, responsive to the request, the transaction credential from being utilized for payment transactions by the first device. The at least one processor is further configured to provision an instance of the transaction credential on the second device. The at least one processor is further configured to cause the instance of the transaction credential to be activated on the second device with a balance corresponding to the stored monetary value associated with the transaction credential.

20 Claims, 8 Drawing Sheets

INTER-DEVICE CREDENTIAL TRANSFER

CROSS-REFERENCE TO RELATED APPLICATIONS

The present application claims the benefit of U.S. Provisional Patent Application Ser. No. 62/396,075, entitled "Inter-Device Credential Transfer," filed on Sep. 16, 2016, which is hereby incorporated by reference in its entirety for all purposes.

TECHNICAL FIELD

The present description relates generally to credential transfers, including inter-device transfers of stored value credentials.

BACKGROUND

In a mobile payment system, a payment applet that is provisioned on a secure element of an electronic device may correspond to a transaction credential ("credential") or card account, such as a credit card account. The payment applet may be used by the electronic device, after an authorized user authenticates with the mobile device (e.g., via fingerprint and/or password), to engage in a wireless payment transaction with, e.g., a wireless payment terminal. For example, after an authorized user authenticates with the electronic device, the electronic device may transmit, to the wireless payment terminal, a request for a wireless payment transaction using the card account corresponding to the payment applet.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
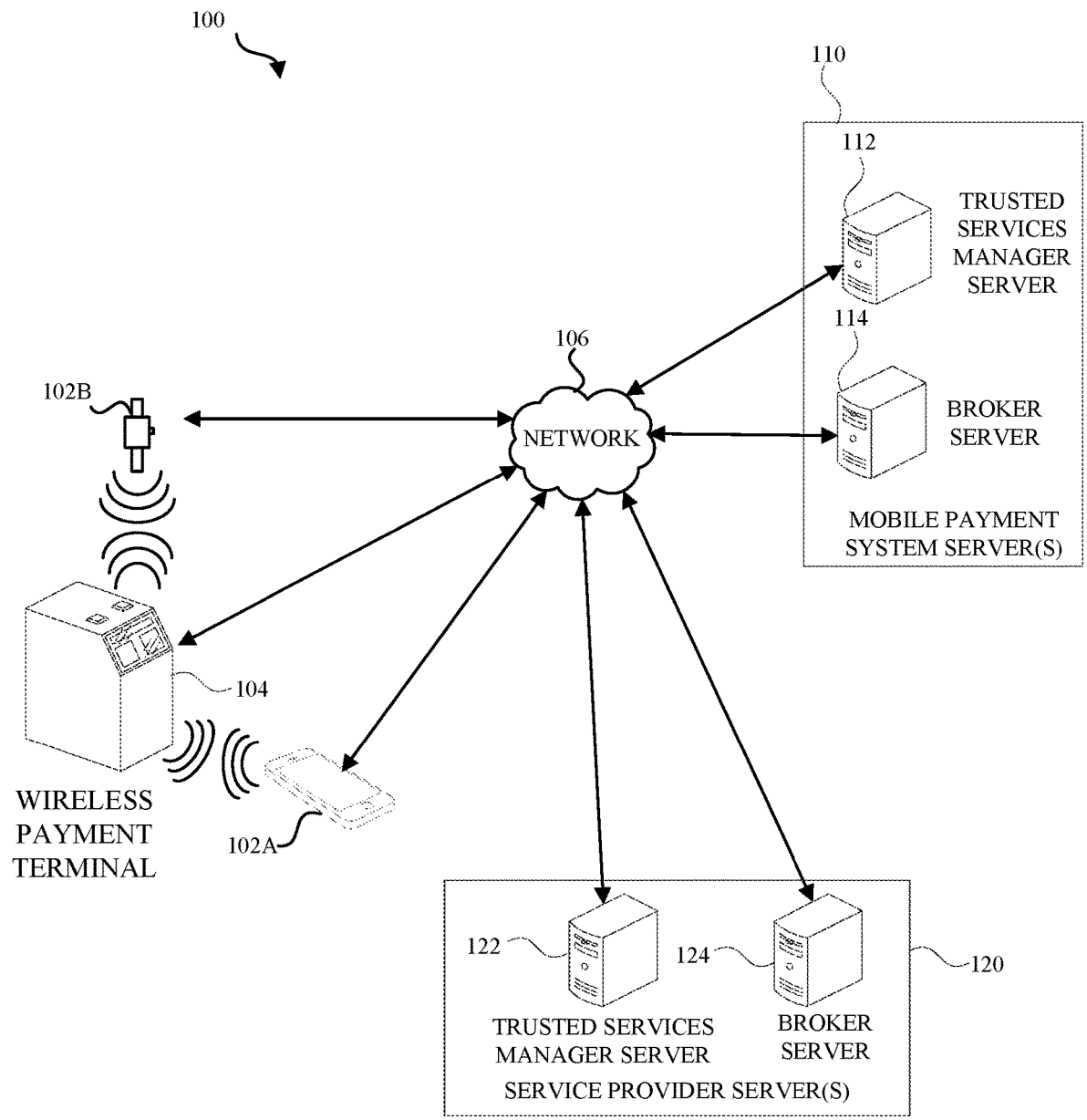
FIG. 1 illustrates an example network environment in which an inter-device credential transfer system may be implemented in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

In a mobile payment system, in addition to the aforementioned payment applets that correspond to credit card accounts, one or more stored value payment applets that correspond to a stored value card (or "truth on card" or "actual cash value" (ACV) card), such as a transit card or other such prepaid card, may be provisioned on a secure element of an electronic device. A stored value card may differ from, e.g., a credit card, in that monetary value is stored with the card itself, rather than being stored in an external account, e.g., maintained by a financial institution. Thus, since a representation of a monetary value may be stored directly in (or in association with) a stored value payment applet, a stored value payment applet corresponding to a given stored value credential should only be provisioned on a single device, e.g., on a single secure element, at any given time, so that only one instance of the monetary value exists. Accordingly, the stored monetary value cannot be used more than once. For example, the monetary value associated with a physical stored value card (or credential) can be transferred to a corresponding stored value payment applet, and the monetary value will no longer be present on the physical stored value card. Similarly, monetary value can be transferred from one stored value payment applet to another, e.g., across devices, but the monetary value can exist only in one applet (in one place) at a time. This may differ from, e.g., a credit card in that a payment applet corresponding to a credit card can be simultaneously provisioned on any number of electronic devices, since the monetary value for the credit card can be centrally managed via an external account, e.g., at a service provider server. Thus, if a stored value payment applet for a stored value credential is already provisioned on a user's electronic device, such as their phone, the user may be unable to access the stored value credential from another electronic device, such as their smartwatch.

The subject system for inter-device credential transfer allows a user to transfer a stored value credential from a first electronic device to a second electronic device, such as from a mobile phone to a smartwatch, or vice-versa. In some implementations, a user can transfer a stored value credential from one device to any other device (e.g., among devices registered to or otherwise accessible to that user). The subject system coordinates the removal of a stored value payment applet corresponding to the stored value credential from the first electronic device, in conjunction with the provisioning of another stored value payment applet corresponding to the stored value credential on the second electronic device, such that a stored value payment applet containing the stored monetary value is only accessible on one of the electronic devices at any given time.

FIG. 1 illustrates an example network environment 100 in which an inter-device credential transfer system may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102A-B, a wireless payment terminal 104, a network 106, one or more mobile payment system servers 110, and one or more service provider servers 120. In one or more implementations, the one or more mobile payment system servers 110 may include a trusted services manager (TSM) server 112 and a broker server 114, and the one or more service provider servers 120 may include a TSM server 122 and a broker server 124. The network 106 may communicatively couple, for example, any two or more of the electronic devices 102A-B, the wireless payment terminal 104, the one or more mobile payment system servers 110 and/or the one or more service provider servers 120. In one or more implementations, the network 106 may be an interconnected network of devices that may include, or may be communicatively coupled to, the Internet.

One or more of the electronic devices 102A-B may communicate with the wireless payment terminal 104 via a direct communication, such as a near field communication (NFC) that bypasses the network 106. In one or more implementations, one or more of the electronic devices 102A-B may communicate with the wireless payment terminal 104 over the network 106 and/or the wireless payment terminal 104 may not be communicatively coupled to the network 106. Further according to one or more implementations, the electronic devices 102A-B may communicate with each other via a direct wireless communication channel (e.g., Bluetooth, Wi-Fi, and the like), through which either of the electronic devices 102A-B may act as a proxy for the other with respect to communicating, e.g., with the one or more mobile payment system servers 110 and/or the one or more service provider servers 120.

The wireless payment terminal 104 may be, for example, a wireless transit payment terminal, a wireless toll payment terminal, a wireless parking meter payment terminal, a wireless point of sale payment terminal, and/or any device that includes one or more wireless interfaces that may be used to perform a wireless payment transaction, such as NFC radios, wireless local area network (WLAN) radios, Bluetooth radios, Zigbee radios, cellular radios, and/or other wireless radios. In FIG. 1, by way of example, the wireless payment terminal 104 is depicted as a wireless transit payment terminal. The wireless payment terminal 104 may be, and/or may include all or part of, the electronic system discussed below with respect to FIG. 8.

The one or more mobile payment system servers 110 may include one or more servers that facilitate providing a mobile payment service to one or more of the electronic devices 102A-B. In one or more implementations, the one or more mobile payment system servers 110 may be and/or may include a secure mobile platform. For example, the mobile payment system servers 110 may include one or more trusted services manager (TSM) servers 112, one or more broker servers 114, one or more application servers, and/or generally any servers that may facilitate providing a mobile payment service.

In one or more implementations, an authorized user of the electronic device 102A and/or the electronic device 102B may have a user account and/or a network account with the mobile payment system via the one or more mobile payment system servers 110. In some implementations, the electronic devices 102A-B may, additionally or alternatively, be associated through a cloud-based registration or direct link. When the same authorized user owns (or is otherwise in control of) both of the electronic devices 102A-B, the electronic devices 102A-B may be effectively paired through the authorized user's account with the one or more mobile payment system servers 110. The user account may be used to manage the various cards and/or credentials that the user has registered with the mobile payment system. The one or more mobile payment system servers 110 may be, and/or may include all or part of, the electronic system discussed below with respect to FIG. 8.

The one or more service provider servers 120 may include one or more servers that facilitate a service being provided, such as a transit service, and/or that may facilitate implementing wireless payment transactions for the service being provided. In one or more implementations, the one or more service provider servers 120 may include one or more servers corresponding to one or more financial institutions. The one or more service provider servers 120 may include one or more TSM servers 122, one or more broker servers 124, one or more application servers, or generally any servers that may facilitate providing a service and/or implementing wireless payment transactions for the service.

In one or more implementations, an authorized user of the electronic device 102A and/or the electronic device 102B may have a user account with one or more service providers associated with one or more service provider servers 120. The user account may be used to, e.g., utilize a credential associated with the service provider for wireless payment transactions via the electronic device 102A and/or the electronic device 102B. The one or more service provider servers 120 may be, and/or may include all or part of, the electronic system discussed below with respect to FIG. 8. For explanatory purposes, the one or more service provider servers 120 are generally described herein with reference to a single transit system. However, the one or more service provider servers 120 may include one or more servers corresponding to multiple different services, such as multiple different transit systems.

In one or more implementations, the broker servers 114, 124 may communicate with each other, such as for purposes of managing user authentication with the one or more service provider servers 120 and/or to transmit scripts from the one or more service provider servers 120 to be provided to a secure element of one or more of the electronic devices 102A-B. One or more of the TSM servers 112,122 may communicate with the secure elements of the electronic devices 102A-B via the network 106 to facilitate managing stored value payment applets provisioned on the secure elements of the electronic devices 102A-B. For example, one or more of the TSM servers 112,122 may transmit scripts to the secure elements of the electronic devices 102A-B for modifying/updating one or more payment applets, and/or for provisioning new payment applets on the secure elements of the electronic devices 102A-B.

The one or more electronic devices 102A-B may be, for example, portable computing devices such as laptop computers, smartphones, peripheral devices (e.g., digital cameras, headphones), tablet devices, wearable devices such as a watch, a band, and the like, or other appropriate devices that include one or more wireless interfaces, such as NFC radios, WLAN radios, Bluetooth radios, Zigbee radios, cellular radios, and/or other wireless radios. In FIG. 1, by way of example, the electronic devices 102A-B are depicted as a mobile device and a smartwatch, respectively. One or more of the electronic devices 102A-B may be, and/or may include all or part of, the electronic device discussed below with respect to FIG. 2 and/or the electronic system discussed below with respect to FIG. 8.

In one or more implementations, one or more of the electronic devices 102A-B may include a secure element onto which one or more payment applets, including one or more stored value payment applets, may be provisioned. An example electronic device that includes a secure element is discussed further below with respect to FIG. 2 and an example secure element is discussed further below with respect to FIG. 3.

To provision a stored value payment applet associated with a service provider on a secure element of one or more of the electronic devices 102A-B, such as the electronic device 102A, a user of the electronic device 102A may access a web site and/or an application ("app") associated with the service provider, such as a web site and/or app provided by the one or more service provider servers 120, and/or the user may interact with a physical device associated with the service provider, such as a stored value card provisioning device, to request that a stored value payment applet for the service provider be provisioned onto the secure element of the electronic device 102A. The user may provide a monetary payment to the service provider, such as a cash payment to a physical machine and/or an electronic payment via the web site or app. The monetary payment may correspond to the monetary value the user would like associated with the stored value payment applet being provisioned on the electronic device 102A.

After completing the transaction with the one or more service provider servers 120, the TSM server 122 and/or the TSM server 112 may cause the stored value payment applet for the service provider to be provisioned on a secure element of the electronic device 102A, such as by transmitting a provisioning script to be executed by a secure element of electronic device 102A. The secure element may execute the provisioning script and provision the stored value payment applet for the service provider on the secure element. After the stored value payment applet is provisioned on the secure element, the one or more service provider servers 120, such as the TSM server 122, may cause the monetary amount paid for by the user to be added to the stored value payment applet, such as by transmitting a personalization script to be executed by the secure element. In one or more implementations, the provisioning script, the personalization script, or generally any script, may be one or more commands that are executed by the secure element to perform a function, such as provisioning a payment applet, freezing a payment applet, removing a payment applet, changing one or more attributes of the payment applet, etc. In some implementations, distribution of a provisioning script and a personalization script can be combined in a transaction having one or more operations.

The stored value payment applet may be provisioned on the secure element with an applet identifier (AID) and/or one or more attributes, such as an attribute storing the amount of the monetary value associated with the stored value payment applet, and/or a transaction state attribute that indicates whether the stored value payment applet is currently being used in a wireless payment transaction, such as for a transit system where an entry station is registered and an exit station is subsequently registered to determine the total fare.

Once a stored value payment applet has been provisioned on the secure element of the electronic device 102A for a given service provider, and a stored value payment mode is active on the electronic device 102A, the user may use the electronic device 102A for a wireless transaction, such as a wireless payment transaction with the wireless payment terminal 104. Thus, when performing a wireless (e.g., NFC-based) payment transaction, the user may place their electronic device 102A on, or in close proximity to (e.g., within approximately 4-20 centimeters), the wireless payment terminal 104 to perform a wireless payment transaction with the wireless payment terminal 104.

In one or more implementations, a user may initiate a transfer of a stored value credential corresponding to a stored value payment applet (e.g., provisioned on a secure element) of the electronic device 102A to the electronic device 102B (e.g., to be provisioned on a secure element), or vice-versa. For example, the user may initiate the transfer by interacting with a web site associated with the one or more mobile payment system servers 110 and/or by interacting with an app associated with the one or more mobile payment system servers 110. Additionally or alternatively, transfer of a stored value payment applet can be initiated on electronic device 102A or 102B, such as through selecting an option in a local user interface. An example user interface of an app for transferring a credential is discussed further below with respect to FIG. 7.

Once the transfer has been initiated, the stored value payment applet corresponding to the stored value credential being transferred can be frozen on the electronic device 102A such that the stored value payment applet cannot be used in wireless payment transactions. The one or more service provider servers 120, such as the TSM server 122, may then read the current stored monetary value and/or any other services and/or transaction states that are stored in the stored value payment applet being transferred. The one or more mobile payment system servers 110, such as the TSM server 112, may then provision another stored value payment applet corresponding to the stored value credential being transferred onto the electronic device 102B (e.g., on a secure element). After the stored value payment applet has been provisioned on the electronic device 102B, the one or more service provider servers 120, such as the TSM server 122, may add the current stored monetary value and/or any other services and/or transaction states to the stored value payment applet on the electronic device 102B. Further, the frozen stored value payment applet may be removed from the electronic device 102A.

An example process of one or more mobile payment system servers 110 facilitating a transfer of a stored value credential from the electronic device 102A to the electronic device 102B is discussed further below with respect to FIG. 4. An example process of the electronic device 102A from which the stored value credential is being transferred is discussed further below with respect to FIG. 5 and an example process of the electronic device 102B on which the stored value credential is being transferred to is discussed further below with respect to FIG. 6.

Figure 2:
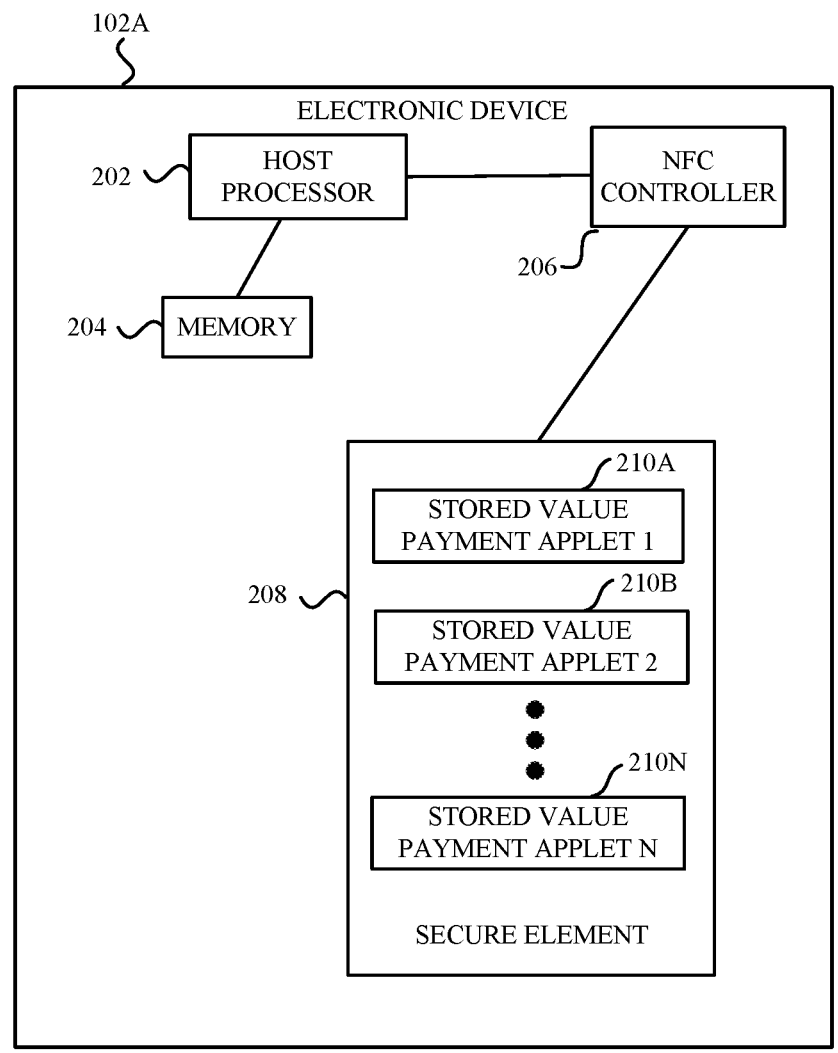
FIG. 2 illustrates an example electronic device that may implement an inter-device credential transfer system in accordance with one or more implementations.

FIG. 2 illustrates an example electronic device 102A that may implement an inter-device credential transfer system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. In one or more implementations, one or more components of the example electronic device 102A may be implemented by the electronic device 102B.

The electronic device 102A may include, among other components, a host processor 202, a memory 204, an NFC controller 206, and a secure element 208. The secure element 208 may include one or more interfaces for communicatively coupling to the NFC controller 206 and/or the host processor 202, such as via one or more single wire protocol (SWP) connections and/or any other data connection. The secure element 208 may include one or more provisioned stored value payment applets 210A-N and/or one or more provisioned payment applets, e.g., corresponding to one or more credit card accounts. In one or more implementations, the operating system and/or execution environment of the secure element 208 may be a JAVA-based operating system and/or JAVA-based execution environment, and the one or more stored value payment applets 210A-N may be JAVA-based applets. In other implementations, other operating systems, languages, and/or environments can be implemented. In addition to the one or more stored value payment applets 210A-N, the secure element 208 may also include one or more additional applets for performing other operations, such as a security applet, a registry applet, and the like.

The one or more stored value payment applets 210A-N may be provisioned on the secure element 208 in part by, for example, the TSM server 112 and/or the broker server 114. For example, the TSM server 112 and/or the broker server 114 may transmit a provisioning script to the electronic device 102A via the network 106. The host processor 202 of the electronic device 102A may receive the script and may provide the script to the secure element 208, such as via the NFC controller 206 and/or directly to the secure element 208. The secure element 208 may perform one or more security mechanisms to verify the received script, such as one or more security mechanisms inherent in a Global Platform framework, and may then execute the received script.

The execution of the script by the secure element 208 may cause one or more of the stored value payment applets 210A-N to be provisioned on the secure element 208. The one or more stored value payment applets 210A-N may each be provisioned with one or more of: an applet identifier, a device primary account number (DPAN) identifier, an identifier of the associated service provider, and/or one or more attributes. The applet identifier associated with a given stored value payment applet 210A may be used by, for example, the host processor 202, the TSM servers 112,122, and/or the broker servers 114,124, to uniquely identify the stored value payment applet 210A relative to the other stored value payment applets 210B-N provisioned on the secure element 208, such as to perform one or more operations with respect to the given stored value payment applet 210A. In one or more implementations, the applet identifiers may be used by the host processor 202 to store associations between the one or more stored value payment applets 210A-N and the associated one or more service provider servers 120.

The one or more attributes provisioned with the one or more applets 210A-N may include, for example, an attribute that indicates the amount of the monetary value that is being locally stored in each applet. In one or more implementations, the one or more applets 210A-N may also be provisioned with an attribute that indicates the type of communication protocol used by the applets to communicate with wireless payment terminal 104. The types of communication protocols may include, for example, an NFC-A protocol, an NFC-B protocol, an NFC-F protocol, a Bluetooth protocol, a Bluetooth low energy protocol, a Zigbee protocol, a Wi-Fi protocol, or generally any communication protocol.

The one or more stored value payment applets 210A-N may correspond to the same service provider, such as the same transit system, and/or may correspond to different service providers, such as different transit systems. In one or more implementations, one of stored value payment applets 210A-N associated with a given service provider may be designated as a default stored value payment applet for the service provider. The default designation may be characterized by a state attribute associated with the stored value payment applet.

The NFC controller 206 may include one or more antennas and one or more transceivers for transmitting/receiving NFC communications. The NFC controller 206 may further include one or more interfaces, such as a single wire protocol interface, for coupling to the host processor 202 and/or the secure element 208. The NFC controller 206 may be able to communicate via one or more different NFC communication protocols, such as NFC-A (or Type A), NFC-B (or Type B), and/or NFC-F (or Type F or FeliCA). The NFC-A protocol may be based on International Organization for Standardization (ISO)/International Electrotechnical Commission (IEC) 14443A and may use Miller bit coding with a 100 percent amplitude modulation. The NFC-B protocol may be based on ISO/IEC 14443B and may use variations of Manchester encoding along with a 10 percent modulation. The NFC-F protocol may be based on FeliCA JIS X6319-4 and may use a slightly different variation of Manchester coding than the NFC-B protocol.

The wireless payment terminal 104 of FIG. 1 may include similar wireless communication capabilities as the electronic device 102A. For example, the wireless payment terminal 104 may include one or more antennas and/or transceivers for communicating with the electronic device 102A via one or more of an NFC-A protocol, an NFC-B protocol, an NFC-F protocol, a Bluetooth protocol, a Bluetooth low energy protocol, a Zigbee protocol, a Wi-Fi protocol, or generally any communication protocol. In one or more implementations, the wireless payment terminal 104 may include a wireless reader, such as an NFC reader.

In one or more implementations, the wireless payment terminal 104 may transmit one or more polling signals, advertisement signals, discovery signals and/or broadcast signals. The signals may be used, for example, to initiate a wireless payment transaction with the electronic device 102A, and the service provider associated with wireless payment terminal 104 may be determinable and/or derivable from the polling signals. For example, the polling signals may be associated with a particular pattern, code, and/or signature (e.g., based on frequency of transmission, signal length, preamble length, etc.) that may be associated with a given service provider, such as in a given geographic region, e.g. continent, country, state, city, etc. Thus, in one or more implementations, the host processor 202 may be able to determine the service provider associated with the wireless payment terminal 104 based at least in part on the polling signals and the geolocation of the electronic device 102A. In one or more implementations, one or more of the polling signals may carry information that identifies the service provider associated with the wireless payment terminal 104.

For explanatory purposes, the electronic device 102A uses the NFC controller 206 to communicate with the wireless payment terminal 104. However, the electronic device 102A may use any wireless communication protocol to communicate with the wireless payment terminal 104, such as Bluetooth, Bluetooth low energy, Wi-Fi, Zigbee, millimeter wave (mmWave), or generally any wireless communication protocol.

The host processor 202 may include suitable logic, circuitry, and/or code that enable processing data and/or controlling operations of the electronic device 102A. In this regard, the host processor 202 may be enabled to provide control signals to various other components of the electronic device 102A. The host processor 202 may also control transfers of data between various portions of the electronic device 102A. Additionally, the host processor 202 may enable implementation of an operating system or otherwise execute code to manage operations of the electronic device 102A. The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, one or more of the host processor 202, the memory 204, the NFC controller 206, the secure element 208, and/or one or more portions thereof, may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
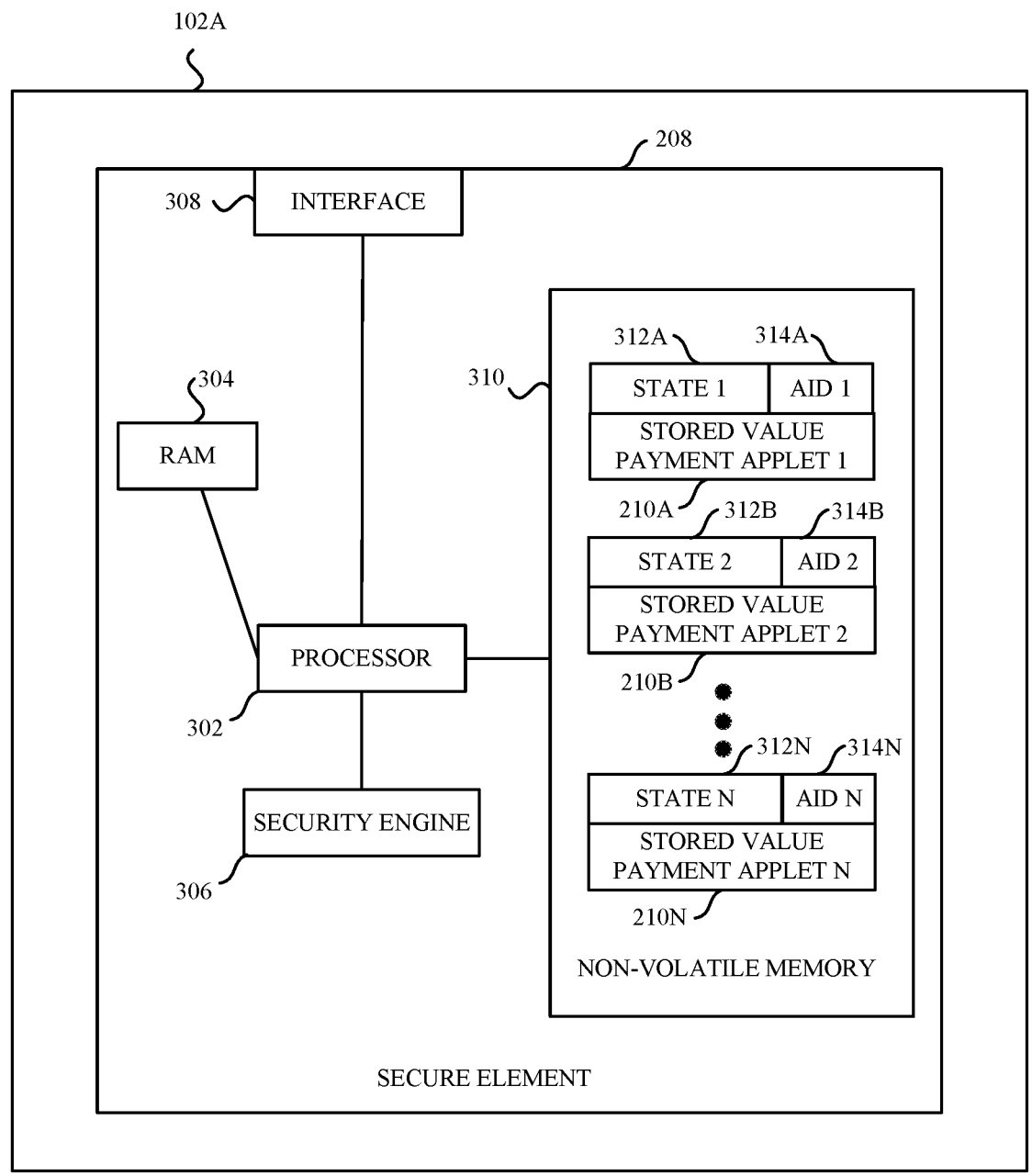
FIG. 3 illustrates an example electronic device including an example secure element that may be used in an inter-device credential transfer system in accordance with one or more implementations.

FIG. 3 illustrates an example electronic device 102A including an example secure element 208 that may be used in an inter-device credential transfer system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. In one or more implementations, one or more components of electronic device 102A illustrated in FIG. 3 may be implemented in electronic device 102B.

The secure element 208 may include, among other components, a secure processor 302, RAM 304, a security engine 306, an interface 308, and non-volatile memory 310. The RAM 304 may include one or more of static RAM (SRAM) and/or dynamic RAM (DRAM). The interface 308 may communicatively couple the secure element 208 to one or more other chips in the electronic device 102A, such as the NFC controller 206 and/or the host processor 202. The interface 308 may be, for example, a SWP interface, a universal serial bus (USB) interface, or generally any data interface. The secure processor 302 may be, for example, a reduced instruction set computing (RISC) processor, an advanced RISC machine (ARM) processor, or generally any processing circuitry.

The security engine 306 may perform one or more security operations for the secure element 208. For example, the security engine 306 may perform cryptographic operations and/or may manage cryptographic keys and/or certificates. In one or more implementations, the communications between the secure element 208 and an external device, such as the wireless payment terminal 104 and/or one or more of the TSM servers 112,122 may be encrypted. For example, for NFC-F communications, an encryption key may be dynamically generated each time mutual authentication is performed. In these one or more implementations, the encryption/decryption and/or key generation/management may be performed all or in part by the security engine 306.

The non-volatile memory 310 may be and/or may include, for example, flash memory. The non-volatile memory 310 may store the attributes and executable code associated with the one or more stored value payment applets 210A-N. In one or more implementations, the non-volatile memory 310 may also store firmware and/or operating system executable code that is executed by the secure processor 302 to provide the execution environment for the one or more stored value payment applets 210A-N, such as a JAVA execution environment.

The one or more stored value payment applets 210A-N may include respective attributes such as one or more states 312A-N and one or more applet identifiers 314A-N. In one or more implementations, the one or more states 312A-N may represent transaction states and may indicate whether the corresponding stored value payment applets 210A-N are being used in an in-progress transaction. For example, in a transit system, the electronic device 102A may be used to register an entry into the transit system, e.g., at the wireless payment terminal 104, and to register an exit from the transit system, e.g., at another wireless terminal. Payment for use of the transit system may be deducted when the electronic device 102A is used to register the exit from the transit system. In one or more implementations, the one or more state attributes 312A-N may also include an indication of the wireless payment terminal 104 at which entry to the transit system was registered and/or an indication of a location of the wireless payment terminal 104, e.g., relative to the transit system.

In one or more implementations, one or more of the secure processor 302, the RAM 304, the security engine 306, the interface 308, the non-volatile memory 310, and/or one or more portions thereof, may be implemented in software (e.g., subroutines and code), hardware (e.g., an ASIC, an FPGA, a PLD, a controller, a state machine, gated logic, discrete hardware components, or any other suitable devices) and/or a combination of both.

Figure 4:
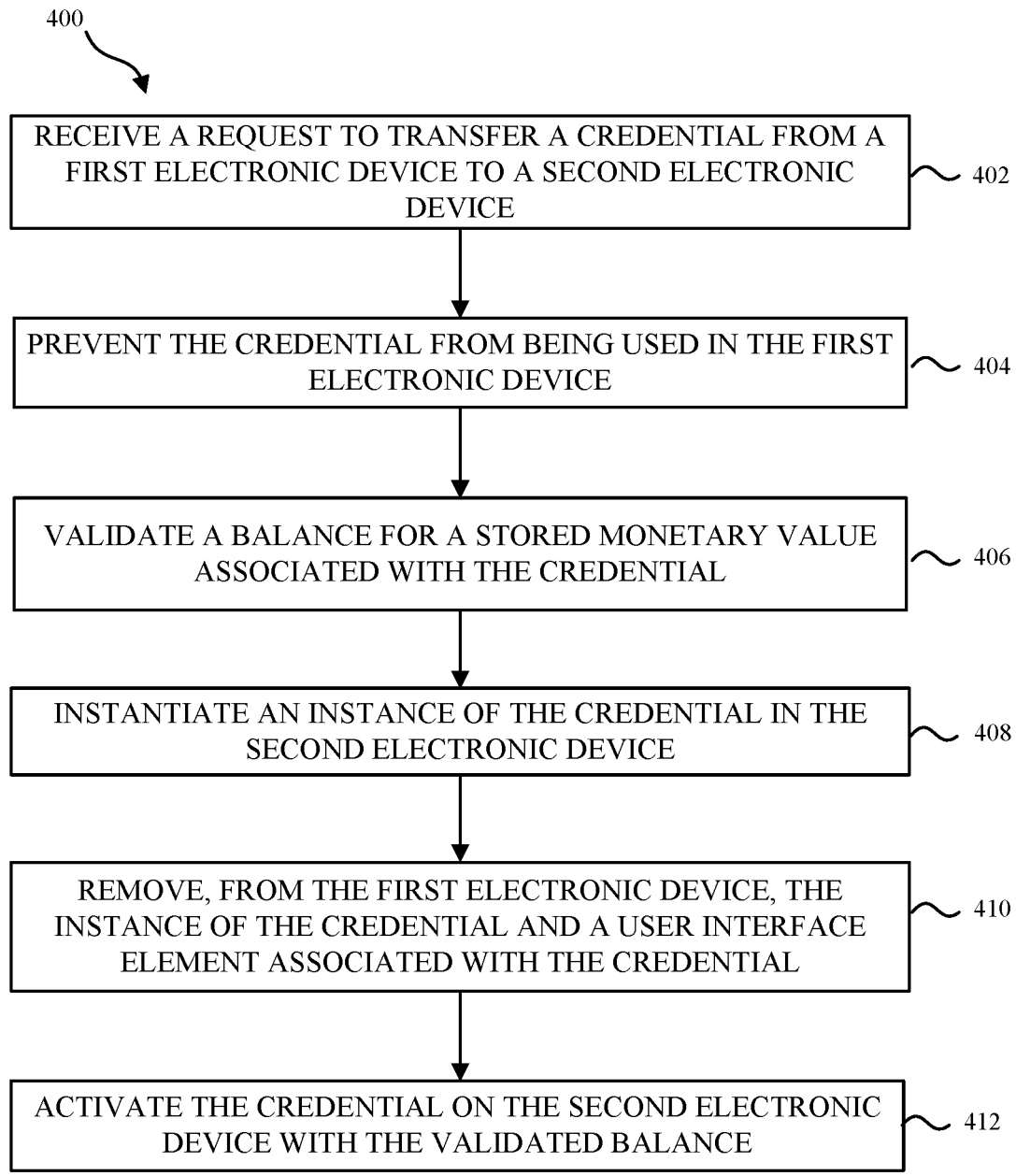
FIG. 4 illustrates a flow diagram of an example process for one or more mobile payment system servers in an inter-device credential transfer system in accordance with one or more implementations.

FIG. 4 illustrates a flow diagram of an example process 400 for one or more mobile payment system servers 110 in an inter-device credential transfer system in accordance with one or more implementations. For explanatory purposes, the process 400 is primarily described herein with reference to the one or more mobile payment system servers 110 of FIG. 1. However, the process 400 is not limited to the one or more mobile payment system servers 110 of FIG. 1, and one or more blocks (or operations) of the process 400 may be performed by one or more other components of the one or more mobile payment system servers 110. For example, the process 400 may be implemented by one or more of the TSM servers 112, 122 and/or the broker servers 114,124, or generally any server communicatively connected to the network 106. Further for explanatory purposes, blocks in the process 400 are described herein as occurring in serial, or linearly. However, multiple blocks of the process 400 may occur in parallel, such that the operations at least partially overlap in time. In addition, blocks in the process 400 need not be performed in the order shown and/or one or more blocks in the process 400 need not be performed and/or can be replaced by other operations. Further, one or more additional operations also can be performed.

The one or more mobile payment system servers 110 receive a request to transfer a stored value credential from a first electronic device 102A to a second electronic device 102B (402). For example, a stored value payment applet 210A corresponding to the stored value credential may be provisioned on the secure element 208 of the electronic device 102A. In one or more implementations, the electronic device 102A may receive a request from a user interacting with an app, such as the app discussed below with respect to FIG. 7, to transfer the stored value credential from the electronic device 102A to the electronic device 102B. The request may include the applet identifier 314A of the stored value payment applet 210A and/or a DPAN identifier associated with the stored value payment applet 210A. In one or more implementations, the broker server 114 of the one or more mobile payment system servers 110 receives the request to transfer the stored value credential from the electronic device 102A and communicates the request to the TSM server 112 of the one or more mobile payment system servers 110 and/or to the broker server 124 of the one or more service provider servers 120 to initiate the transfer of the credential.

The one or more mobile payment system servers 110, such as the TSM server 112, prevent the credential from being used in the electronic device 102A (404). For example, the TSM server 112 may transmit a script to the electronic device 102A that, when executed by the secure element 208, causes the stored value payment applet 210A to be frozen, such that the stored value payment applet 210A cannot be used by the electronic device 102A in wireless payment transactions. In one or more implementations, the script may identify the stored value payment applet 210A based on the applet identifier 314A of the stored value payment applet 210A.

Once the credential is frozen, the one or more mobile payment system servers 110 validate a balance for the stored monetary value associated with the credential and/or any services associated with the credential (406). For example, the TSM server 112 may receive a query from the broker server 124 of the one or more service provider servers 120, and the TSM server 112 may transmit the query to the electronic device 102A for querying the secure element 208. The secure element 208 may respond to the query by providing one or more attributes of the frozen stored value payment applet 210A, such as the stored monetary value, any transaction state, and/or any other attributes of the stored value payment applet 210A.

After validating the balance, the one or more mobile payment system servers 110 instantiate an instance of the credential on the second electronic device 102B (408). For example, the TSM server 112 may provision another stored value payment applet corresponding to the credential in a secure element of the second electronic device 102B, such as by transmitting a provisioning script to the second electronic device 102B for execution by the secure element of the second electronic device 102B. The one or more mobile payment system servers 110 may also remove the instance of the credential, e.g. the frozen stored value payment applet 210A, from the secure element 208 of the first electronic device 102A. Further, a user interface element associated with the credential can be removed from a mobile payment system app running on the first electronic device 102A (410). For example, the TSM server 112 may transmit a script to the electronic device 102A that, when executed by the secure element 208, causes the frozen stored value payment applet to be removed from the secure element 208. The broker server 114 may communicate with the mobile payment system app to refresh the mobile payment system app to reflect that the frozen stored value payment applet 210A has been removed from the secure element 208.

The one or more mobile payment system servers 110 may then activate the credential on the second electronic device 102B with the validated balance and any other retained attributes, such as attributes indicating authorized services, current transaction states, etc. (412). For example, the TSM server 112 may transmit a personalization script to the electronic device 102B that, when executed by the secure element of the electronic device 102B, activates the stored value payment applet corresponding to the credential with the validated balance and any other retained attributes.

In one or more implementations, when the credential was configured to be the default credential for the service provider in the electronic device 102A, the credential may be automatically configured to be the default credential for the service provider in the electronic device 102B. For example, the broker server 114 may communicate with the mobile payment system app on the electronic device 102B to configure the mobile payment system app to designate the credential as the default credential for the service provider. In one or more implementations, the default credential may be utilized by the electronic device 102B in a wireless payment transaction without receiving user authentication or other user input.

Figure 5:
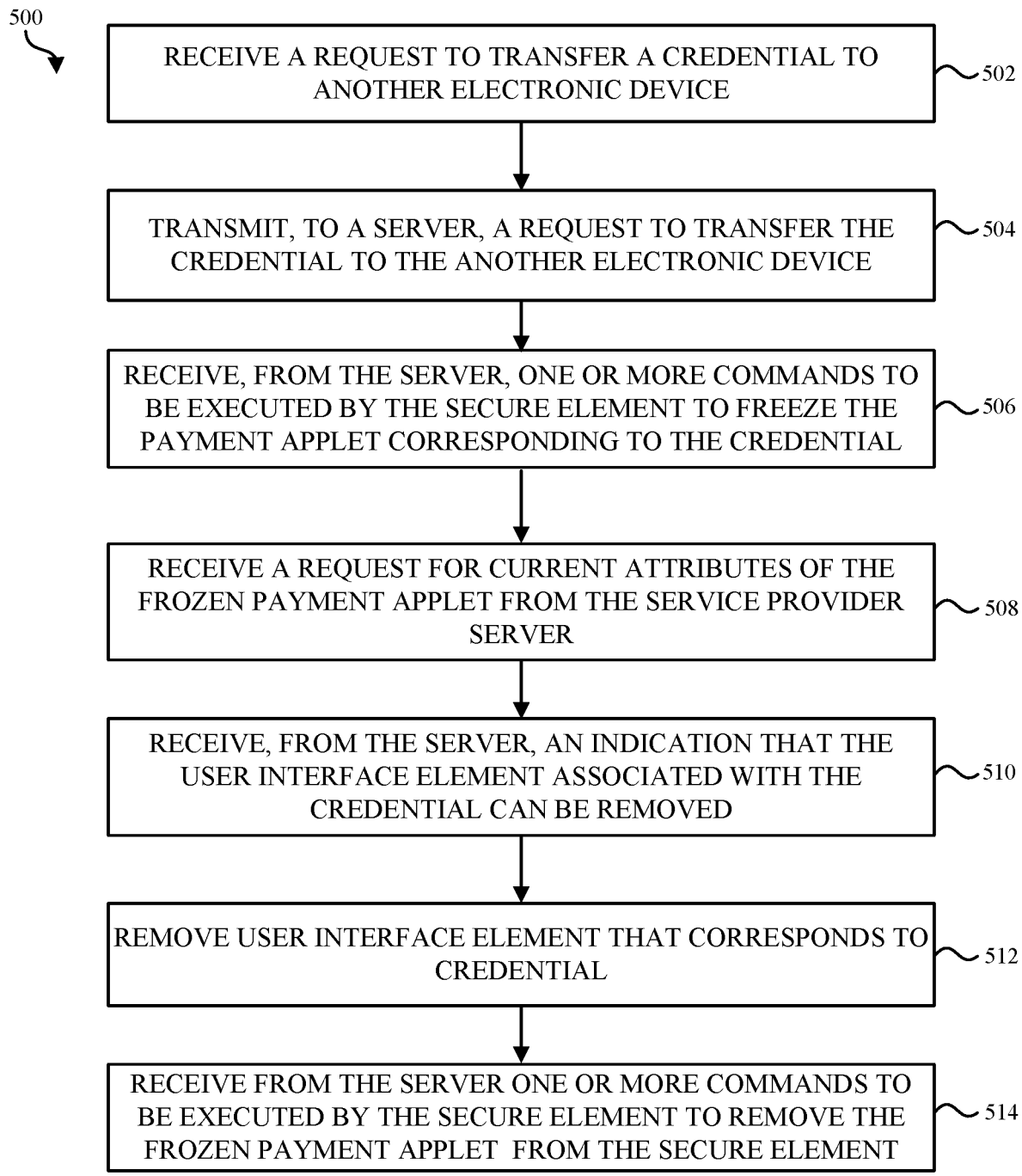
FIG. 5 illustrates a flow diagram of an example process for an electronic device from which a stored value credential is being transferred in an inter-device credential transfer system in accordance with one or more implementations.

FIG. 5 illustrates a flow diagram of an example process 500 for an electronic device 102A from which a stored value credential is being transferred in an inter-device credential transfer system in accordance with one or more implementations. For explanatory purposes, the process 500 is primarily described herein with reference to the electronic device 102A of FIGS. 1-2. However, the process 500 is not limited to the electronic device 102A and one or more blocks (or operations) of the process 500 may be performed by the electronic device 102B and/or any other type of electronic device. Further for explanatory purposes, blocks in the process 500 are described herein as occurring in serial, or linearly. However, multiple blocks of the process 500 may occur in parallel, such that the operations at least partially overlap in time. In addition, blocks in the process 500 need not be performed in the order shown and/or one or more blocks in the process 500 need not be performed and/or can be replaced by other operations. Further, one or more additional operations also can be performed.

The electronic device 102A receives a request to transfer, to another electronic device 102B, a credential that corresponds to a stored value payment applet 210A that is provisioned on the secure element 208 of the electronic device 102A (502). For example, the electronic device 102A may receive the request from a user interacting with a mobile payment system app on the electronic device 102A.

Upon receipt of the request, the electronic device 102A transmits, to the one or more mobile payment system servers 110, such as the broker server 114, a request to transfer the credential to the electronic device 102B (504). In response to transmitting the request, the electronic device 102A receives from the one or more mobile payment system servers 110, such as the TSM server 112, one or more commands to be executed by the secure element 208 to freeze the stored value payment applet 210A on the secure element 208 (506). The host processor 202 of the electronic device 102A may provide the one or more commands to the secure element 208 for execution, which freezes the stored value payment applet 210A.

After the stored value payment applet 210A is frozen, the electronic device 102A may receive a request from one or more of the service provider servers 120, such as the broker server 124 and/or the TSM server 122, for the current attributes of the credential that are stored in the frozen stored value payment applet 210A (508). For example, the TSM server 122 may transmit a query that includes the applet identifier 314A of the frozen stored value payment applet 210A to the secure element 208 via the host processor 202 of the electronic device 102A. The secure element 208 may respond to the query with the current attributes of the stored value payment applet 210A. In one or more implementations, the request may be transmitted to the electronic device 102A by the TSM server 112 on behalf of the TSM server 122.

The electronic device 102A may then receive, from the one or more mobile payment system servers 110, such as the broker server 114, an indication that a user interface element that corresponds to the credential can be removed from the mobile payment system app (510). The electronic device 102A may remove the user interface element responsive to receiving the indication (512). The electronic device 102A may then receive from the one or more mobile payment system servers 110, such as the TSM server 112, one or more commands to be executed by the secure element 208 to remove the frozen stored value payment applet 210A from the secure element 208 (514). The host processor 202 of the electronic device 102A may provide the one or more commands to the secure element 208 for execution, which removes the frozen stored value payment applet 210A from the secure element 208.

Figure 6:
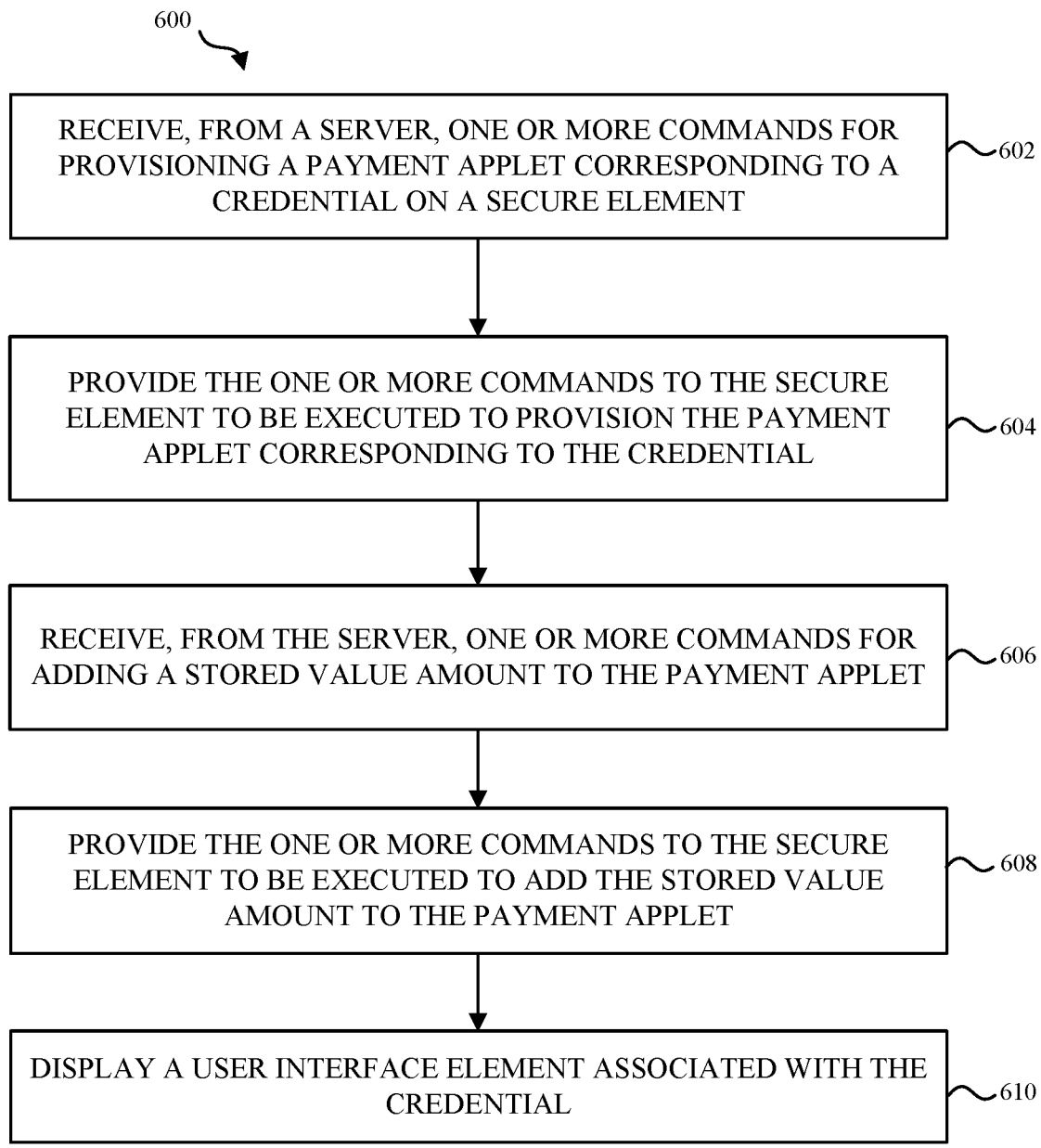
FIG. 6 illustrates a flow diagram of an example process for an electronic device onto which a stored value credential is being transferred in an inter-device credential transfer system in accordance with one or more implementations.

FIG. 6 illustrates a flow diagram of an example process 600 for an electronic device 102B onto which a stored value credential is being transferred in an inter-device credential transfer system in accordance with one or more implementations. For explanatory purposes, the process 600 is primarily described herein with reference to electronic device 102B of FIG. 1. However, the process 600 is not limited to the electronic device 102B and one or more blocks (or operations) of the process 600 may be performed by the electronic device 102A and/or any other type of electronic device. Further for explanatory purposes, blocks in the process 600 are described herein as occurring in serial, or linearly. However, multiple blocks of the process 600 may occur in parallel, such that the operations at least partially overlap in time. In addition, blocks in the process 600 need not be performed in the order shown and/or one or more blocks in the process 600 need not be performed and/or can be replaced by other operations. Further, one or more additional operations also can be performed.

After a transfer of a credential has been initiated, such as by the electronic device 102A, the electronic device 102B receives, from the one or more mobile payment system servers 110, such as the TSM server 112, one or more commands for provisioning a stored value payment applet corresponding to the credential on a secure element of the electronic device 102B (602). The host processor of the electronic device 102B provides the one or more commands to the secure element to be executed to provision the stored value payment applet (604).

The electronic device 102B then receives, from the one or more service provider servers 120, such as the TSM server 122, one or more commands for adding a stored value amount and/or any other attributes to the stored value payment applet corresponding to the credential (606). In one or more implementations, the TSM server 112 may transmit the one or more commands to the electronic device 102B on behalf of the TSM server 122. The host processor of the electronic device 102B may provide the one or more commands to the secure element of the electronic device 102B for execution to add the stored value amount and any other attributes to the stored value payment applet corresponding to the credential (608).

In one or more implementations, the electronic device 102B may then display a user interface element associated with the credential, such as in a mobile payment system app (610). The user interface element may be used to receive a selection of the credential from a user, e.g., for use in a wireless payment transaction.

Figure 7:
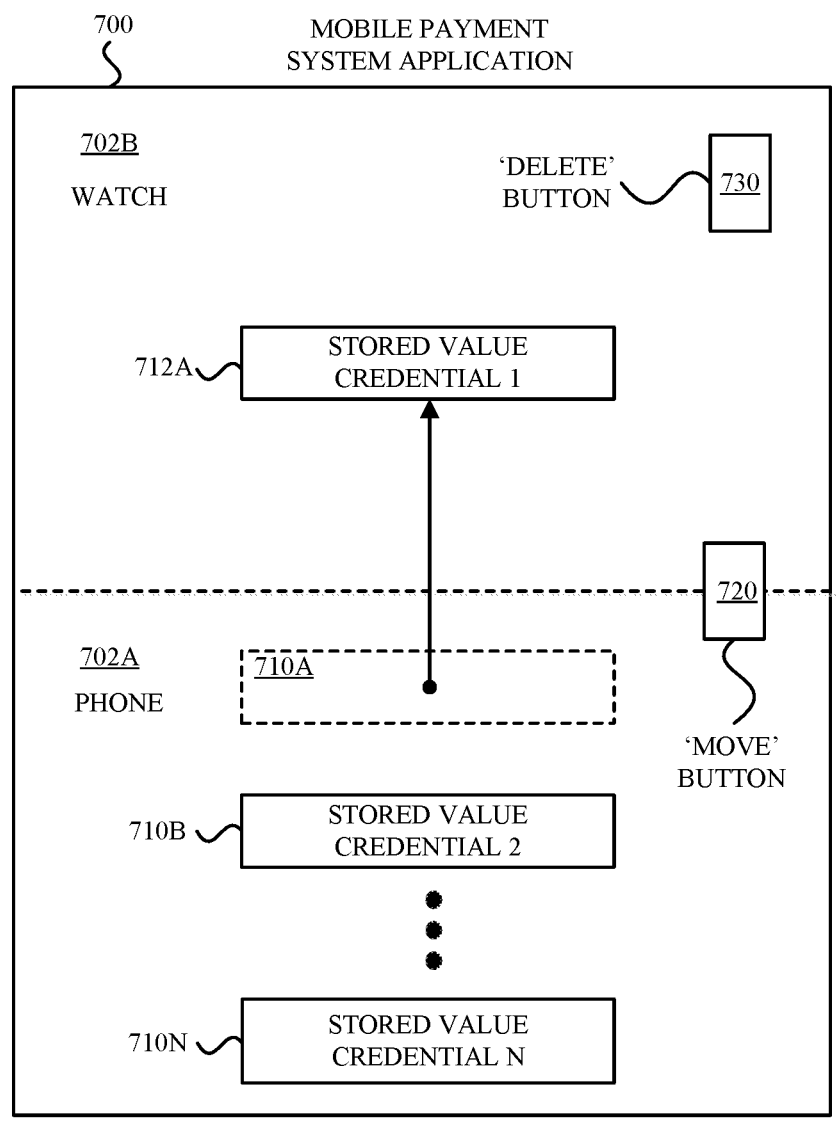
FIG. 7 illustrates an example user interface of an example mobile payment system application that may be used in an inter-device credential transfer system in accordance with one or more implementations.

FIG. 7 illustrates an example user interface 700 of an example mobile payment system application that may be used in an inter-device credential transfer system in accordance with one or more implementations. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional graphical elements, different graphical elements, or fewer graphical elements may be provided.

The user interface 700 may be utilized in a mobile payment system application that may be installed on one or more of the electronic devices 102A-B. For explanatory purposes, the user interface 700 is described herein as being displayed on the electronic device 102A (e.g., a mobile phone) to receive management selections from a user with respect to the electronic device 102B (e.g., a wearable device such as a watch, band or the like) that may be directly or indirectly communicatively coupled to the electronic device 102A.

The phone section 702A of the user interface 700 includes user interface elements 710B-N that correspond to the stored value payment applets 210B-N currently provisioned on the secure element 208 of the electronic device 102A. In the user interface 700, a selection of the user interface element 710A followed by a selection of the button 720 were previously received, which caused the stored value payment applet 210A to be transferred to the electronic device 102B and consequently resulted in the user interface element 710A being removed from the phone section 702A and the user interface element 712A being added to the watch section 702B. In one or more implementations, the watch section 702B may include a button 730 that receives a user selection to remove a selected stored value payment applet from the electronic device 102B. For example, a selection of the user interface element 712A followed by a selection of the button 730 may result in the removal of the stored value payment applet 210A corresponding to the user interface element 712A from the secure element of the electronic device 102B.

Figure 8:
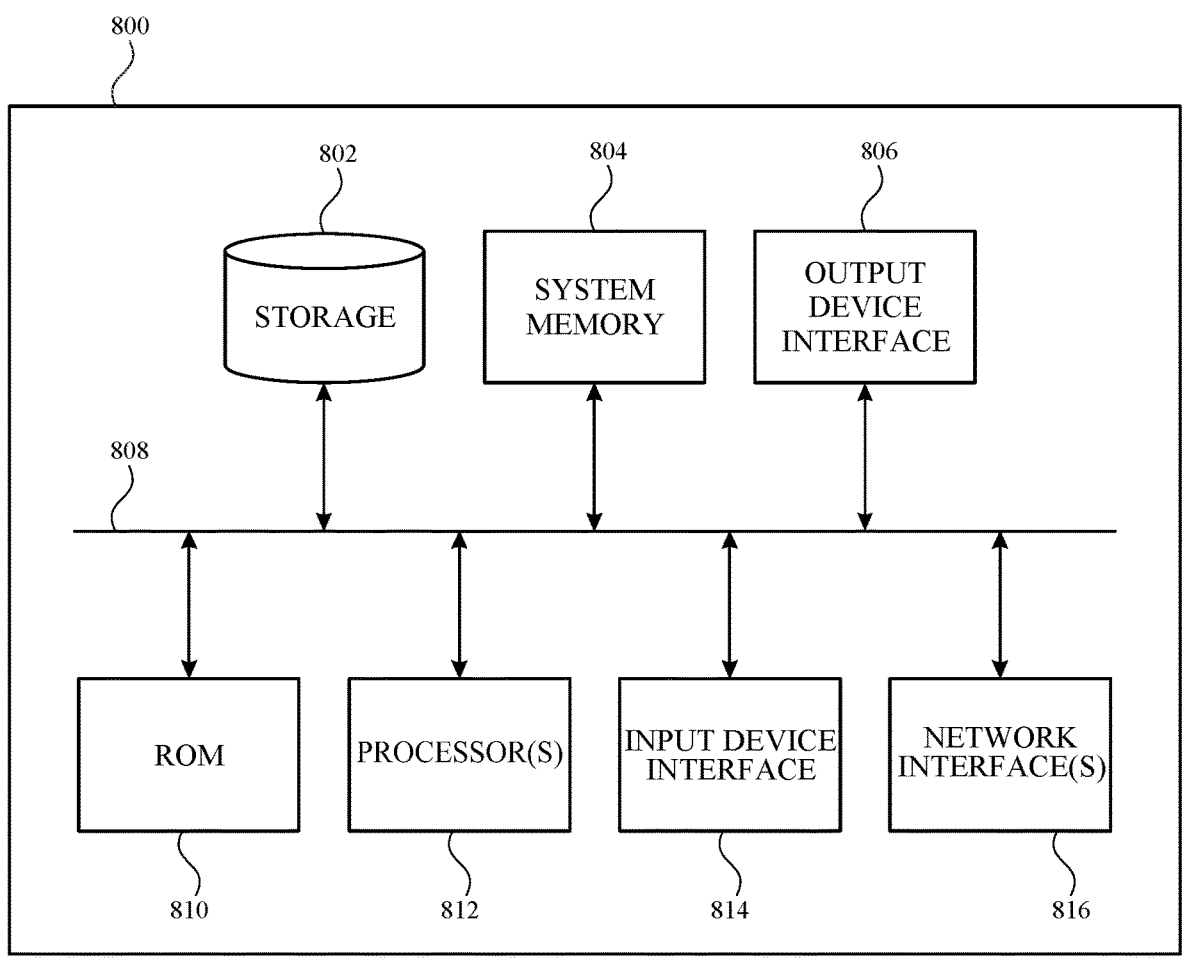
FIG. 8 illustrates an electronic system with which aspects of the subject technology may be implemented in accordance with one or more implementations.

FIG. 8 illustrates an electronic system 800 with which one or more implementations of the subject technology may be implemented. The electronic system 800 can be, and/or can be a part of, one or more of the electronic devices 102A-B, the wireless payment terminal 104, and/or one or more of the servers 110, 120 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the electronic devices 102A-B shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   receiving a request to transfer a transaction credential from a first device to a second device, the transaction credential being associated with a stored monetary value; and
   responsive to the request:
      preventing the transaction credential from being utilized for payment transactions by the first device,
      provisioning an instance of the transaction credential on the second device, and
      causing the instance of the transaction credential to be activated on the second device with a balance corresponding to the stored monetary value associated with the transaction credential.

2. The method of claim 1, further comprising:
   prior to activating the instance of the transaction credential on the second device, validating, with a service provider server associated with the transaction credential, the balance corresponding to the stored monetary value associated with the transaction credential.

3. The method of claim 1, wherein provisioning the instance of the transaction credential on the second device comprises provisioning, by a trusted service manager server, a payment applet corresponding to the transaction credential on the second device.

4. The method of claim 1, wherein causing the instance of the transaction credential to be activated on the second device with the balance corresponding to the stored monetary value associated with the transaction credential comprises:

receiving, from a service provider server, one or more commands that, when executed by a secure element of the second device, activate the transaction credential on the second device with the balance corresponding to the stored monetary value; and providing the one or more commands to the secure element of the second device.

5. The method of claim 1, wherein preventing the transaction credential from being utilized for payment transactions by the first device comprises:

providing, to a secure element of the first device, one or more commands that, when executed by the secure element of the first device, prevent the transaction credential from being utilized for payment transactions by the first device.

6. The method of claim 1, wherein the transaction credential is configured as a default transaction credential for the first device when the request to transfer is received, and the method further comprising:

configuring the transaction credential as a default transaction credential for the second device.

7. The method of claim 1, wherein the transaction credential is associated with a first transaction state corresponding to an in-progress transaction when the request to transfer is received, and causing the instance of the transaction credential to be activated on the second device with the balance corresponding to the stored monetary value associated with the transaction credential comprises:

causing the instance of the transaction credential to be activated on the second device with the balance corresponding to the stored monetary value associated with the transaction credential and with the transaction credential being associated with the first transaction state.

8. The method of claim 1, further comprising:

causing an initial instance of the transaction credential to be removed from the first device.

9. The method of claim 1, wherein the first and second devices are both associated with a common network account.

10. The method of claim 1, further comprising causing a removal of a user interface element associated with the transaction credential on the first device after the instance of the transaction credential is activated on the second device.

11. A system, comprising:

a memory; and at least one processor configured to:

receive a request to transfer a transaction credential from a first device to a second device, the transaction credential being associated with a stored monetary value;

provision an instance of the transaction credential on the second device; and cause the instance of the transaction credential to be activated on the second device with a balance corresponding to the stored monetary value associated with the transaction credential.

12. The system of claim 11, wherein the at least one processor is further configured to:

responsive to receipt of the request, provide, to a secure element of the first device, one or more commands that, when executed by the secure element of the first device, prevent the transaction credential from being utilized for payment transactions by the first device.

13. The system of claim 11, wherein the at least one processor is further configured to:

prior to activating the instance of the transaction credential on the second device, validate, with a service provider server associated with the transaction credential, the balance corresponding to the stored monetary value associated with the transaction credential.

14. The system of claim 11, wherein the transaction credential is configured as a default transaction credential for the first device when the request to transfer is received, and the at least one processor is further configured to:

configure the transaction credential as a default transaction credential for the second device.

15. The system of claim 11, wherein the first and second devices are both associated with a same user account.

16. The system of claim 11, wherein the at least one processor is further configured to:

receive, from a service provider server, one or more commands that, when executed by a secure element of the second device, activate the transaction credential on the second device with the balance corresponding to the stored monetary value; and provide the one or more commands to the secure element of the second device to cause the instance of the transaction credential to be activated on the second device with the balance corresponding to the stored monetary value associated with the transaction credential.

17. A non-transitory machine-readable medium comprising code that, when executed by one or more processors, cause the one or more processors to perform operations, the code comprising:

code to receive a request to transfer a transaction credential from a first device to a second device, the transaction credential being associated with a stored value;

code to prevent, responsive to the request, the transaction credential from being utilized for payment transactions by the first device;

code to provision an instance of the transaction credential on the second device; and code to cause the instance of the transaction credential to be activated on the second device with the stored value associated with the transaction credential.

18. The non-transitory machine-readable medium of claim 17, wherein the code further comprises:

code to, prior to activating the instance of the transaction credential on the second device, validate, with a service provider server associated with the transaction credential, the stored value associated with the transaction credential.

19. The non-transitory machine-readable medium of claim 17, wherein the first and second devices are both associated with a same user account.

20. The non-transitory machine-readable medium of claim 17, wherein the code further comprises:

code to receive, from a service provider server, one or more commands that, when executed by a secure element of the second device, activate the transaction credential on the second device with the stored value; and provide the one or more commands to the secure element of the second device to cause the instance of the transaction credential to be activated on the second device with the stored value.

* * * * *